No. 765,375. PATENTED JULY 19, 1904.
P. BRUFFAERS.
MACHINE FOR DYEING SKINS.
APPLICATION FILED OCT. 30, 1903.
NO MODEL. 2 SHEETS—SHEET 1.
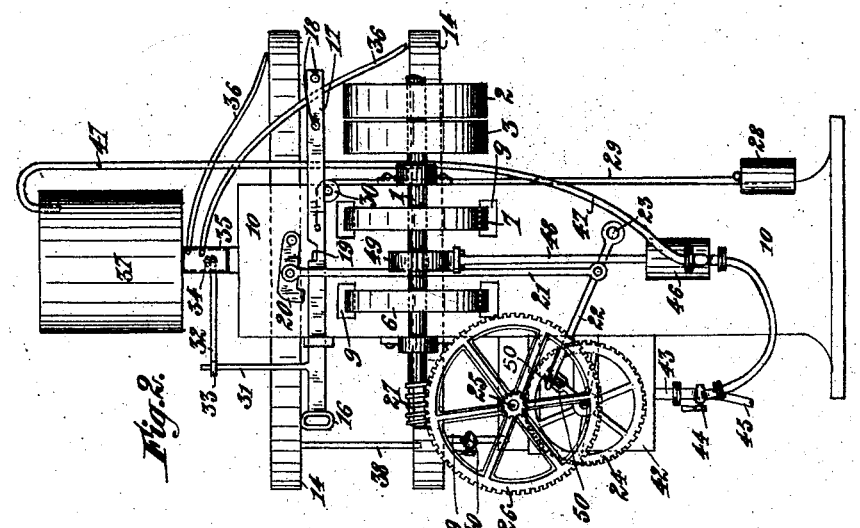

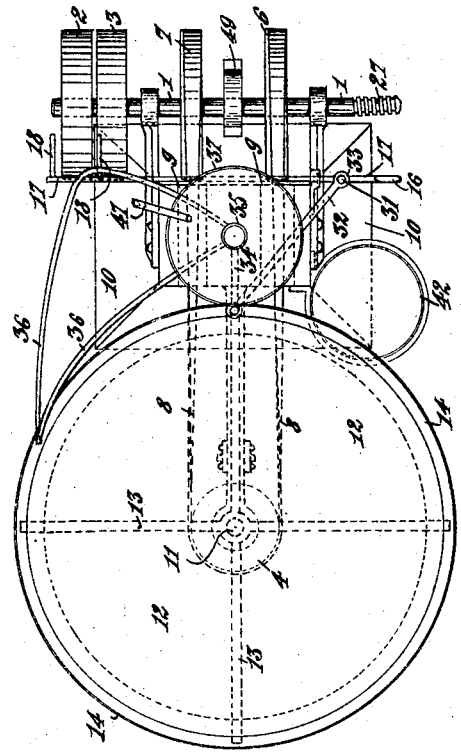

No. 765,375. Patented July 19, 1904.

UNITED STATES PATENT OFFICE.

PIERRE BRUFFAERS, OF SCHAERBEEK, BELGIUM, ASSIGNOR OF ONE-HALF TO HENRY M. PEYSER, OF BOSTON, MASSACHUSETTS.

MACHINE FOR DYEING SKINS.

SPECIFICATION forming part of Letters Patent No. 765,375, dated July 19, 1904.

Application filed October 30, 1903. Serial No. 179,172. (No model.)

*To all whom it may concern:*

Be it known that I, PIERRE BRUFFAERS, manufacturer, a subject of the King of Belgium, residing at Schaerbeek, Belgium, have invented a new and useful Machine for Dyeing Skins; and I do hereby declare the following to be a full, clear, and exact description of the same.

The present invention has for its object a machine for dyeing skins.

In the annexed drawings is represented, by way of example, a form of construction of the object of the invention.

Figure 1 is a side elevation, partly in section. Fig. 2 is a front elevation. Fig. 3 is a plan.

According to this invention the shafting 1, on which the fast (3) and the loose (2) pulleys are fixed and over which the belting coming from the engine travels, controls the two pulleys 4 and 5 by means of the pulleys 6 and 7, one of which is fixed and the other of which is loose on shaft 1, and the belting 8, which passes through the openings 9 of the framework 10. The pulleys 4 and 5 are keyed on the axles 11 of the face-plates 12, placed one above the other. In the annexed drawings only two face-plates are represented; but in reality any number may be added and a rotary movement imparted to each one by transmitting such movement from the shafting 1 by means of any of the several mechanical combinations used for this purpose. The shaft 1 might, for instance, be made to turn a vertical shaft containing as many pulleys as there are face-plates, each one of these pulleys controlling separately each one of the face-plate pulleys. The face-plates 12 may be either quite flat or slightly convex. Each one of the face-plates 12 is supported by a cross-piece 13, keyed on the axle 11. A face-plate can thus be taken off or replaced with the utmost ease. Each face-plate 12 revolves in a circular groove 14, supported by a fixed cross-piece 15.

To put the machine in motion, the belt is slipped from the loose pulley 2 onto the fast pulley 3 by pulling the handle 16 of the slide-rod 17, supporting the two arms 18, which guide the belt. The slide-rod 17 has a slot 19, into which slips the catch 20 when the slide-rod 17 is in such a position that the belt runs on the fast pulley. The catch 20 is connected by a rod 21 to a lever 22, turning on an axle 23. This lever 22 can at any given moment be raised by a pin 50, fixed to the wheel 24, which receives a rotary motion by means of the wheels 25 and 26 and the worm 27, attached to the shaft 1. When this lever 22 is raised, it lifts at the same time the catch 20, which releases the slide-rod 17, and the belt is brought back onto the loose pulley 2 by means of the counterpoise 28, which is suspended to the slide-rod 17 by the wire rope 29, passing over the pulley 30. To this slide-rod 17 is attached an arm 31, working in the socket 33 of another lever 32, connected to the crank 34. This crank 34 is connected to a socket 35, provided with as many fixed tubes 36 as there are face-plates 12. In the position represented in the drawings—that is to say, when the machine is at rest—the tubes 36 have their upper extremities opposite the solid parts of the head on which the socket 35 turns and their lower extremities above the annular grooves 14. When the machine is set in motion by pulling slide-rod 17, the crank 34 turns the socket around, so that the upper extremities of the tubes 36 are brought exactly opposite holes drilled in the head on which the socket 35 turns and are therefore put into communication with the dyeing-tank 37, while the lower ends of the tubes are caused to move to a point approximately above the centers of the plates 12.

The annular grooves 14 are joined together by the tubes 38. The lower groove is connected by means of a pipe 39, furnished with a three-branched cock 40, on the one hand with a blow-off pipe 41 and on the other with a receptacle 42. This receptacle 42 is in its turn connected by a pipe 43, furnished with a three-branched cock 44, with a blow-off pipe 45 on the one hand and a force and suction pump on the other. The pipe 47 from the force-pump dips into the upper part of the dyeing-tank 37. The pump 46 is worked by means of a rod 48, attached to the eccentric 49, fixed on the main driving-shaft 1.

The working of the machine is as follows: A workman stretches a skin on each of the different face-plates and then places the plates on the cross-pieces 13. He pulls the slide-rod 17, and the machine at once gets into motion. The dye issuing from the dyeing-tank 37 comes into contact with the skin and as a consequence of the centrifugal force spreads itself over the whole surface of the skins laid on the rotary plates 12. The surplus dye runs away into the grooves 14. When the wheel 24 has completed a revolution, the pin 50, which can be adjusted in a radial slot 51 in the wheel, engages and lifts lever 22, consequently lifting catch 20, and so releasing the slide-bar, whereby the driving-belt is shifted from the fast to the loose pulley. While the machine is running the workman employs his time in preparing and fixing other skins on supplementary plates, which take the place of those taken off the machine and which in their turn are subjected to the action of the dye. The dye which has accumulated in the grooves is run off into the receptacle 42; but in order that this dye shall not get mixed up with urine or other corrosive substance the blow-off pipe 41 is first opened and a certain quantity of the dye escapes, carrying along with it the urine or corrosive products. The communication with the receptacle is then established. As soon as the machine is set in motion again the force and suction pump 46 draws off the dye collected in the receptacle 42 into the tank 37. Fresh dye can be introduced into the tank 37 either continuously or at intervals, at will.

This dyeing-machine offers numerous advantages. It realizes a considerable economy in labor. It dyes at a single operation as many skins as there are plates. The plates being easily changed, the time lost by the stoppage of the machine is reduced to a minimum.

I declare that what I claim is—

In a machine for dyeing skins, the combination of the frame, a rotary drive-shaft arranged therein, fast and loose pulleys arranged on said shaft, a belt-shifting slide-rod arranged in operative proximity to said pulleys, the same having a notch therein, means for normally holding said slide-rod at one of its limits of movement, a pivoted catch engageable with said notch, holders on which the skins are maintained extended, means for transmitting power from the drive-shaft to said holders whereby to rotate the holders, means for discharging the dyeing materials onto the skins while so held, and means, actuative from the drive-shaft, for automatically moving said catch and thereby releasing said slide-rod, substantially as described.

In testimony whereof I have signed this specification in the presence of two subscribing witnesses.

PIERRE BRUFFAERS.

Witnesses:
 JOSEPH MARKL,
 GREGORY PHELAN.